Oct. 26, 1965  E. A. JOHNSON  3,213,878
FUEL PUMP CHECK VALVE
Filed Jan. 21, 1963  2 Sheets-Sheet 1

INVENTOR.
ELDON A. JOHNSON
BY
AGENT

United States Patent Office 3,213,878
Patented Oct. 26, 1965

3,213,878
FUEL PUMP CHECK VALVE
Eldon A. Johnson, St. Louis, Mo., assignor to ACF Industries Incorporated, New York, N.Y., a corporation of New Jersey
Filed Jan. 21, 1963, Ser. No. 252,888
1 Claim. (Cl. 137—513.7)

This invention relates to fuel pumps, and more particularly to an automotive fuel pump, i.e., a pump for pumping automotive fuel from the fuel tank of an automotive vehicle to the carburetor of the internal combustion engine of the vehicle.

An automotive fuel pump is typically a diaphragm pump, having a pumping chamber closed by a diaphragm which is operable by a drive from the engine of the vehicle, and having an inlet check valve which opens on a suction stroke of the diaphragm and closes on a discharge stroke of the diaphragm, and an outlet check valve which opens on a discharge stroke and closes on a suction stroke of the diaphragm. Such a pump is typically mounted on the engine, where it is subjected to the heat of the engine. Among the several objects of this invention may be noted the provision of an improved construction for such valves, which comprises a ported valve seat and a disc valve member made of rubber or rubber-like material spring-biased toward the seat, and which is so constructed as to avoid warping of the valve member such as might otherwise result from engine heat or other causes, thereby to assure proper seating of the valve member; the provision of a valve construction in which, in addition to the anti-warping tendency above mentioned, there is less tendency for dirt to remain on the valve seat under the valve member, thereby avoiding improper seating of the valve member on account of dirt; and the provision of a valve construction such as described which is such as to reduce the tendency of the valve member to bend, thereby to attain more of a sliding action of the valve member away from and toward the seat, avoiding lost motion of the valve member and obtaining faster full seating and unseating of the valve member for improved pumping action. In general, these objects are attained by providing the valve seat with at least one port spaced outward from a stem extending from the seat, the valve member being slidable on the stem, and by providing a coil compression spring surrounding the stem and reacting from a head on the stem against the valve member to bias the valve member toward the seat, the spring being of such diameter at its end toward the valve member as to engage the valve member between the confines of the port. More particularly, the seat is provided with a pair of concentric ribs engageable by the valve member, the port being located between the ribs, the spring engaging the valve member between the confines of the ribs. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, FIG. 1 is a vertical section of a diaphragm pump having inlet and outlet check valves of this invention as it is used on the engine of an automotive vehicle for pumping fuel from the fuel tank of the vehicle to the carburetor for the engine, the engine and the fuel tank being shown diagrammatically;

Corresponding reference characters indicate corresponding parts throughout the several views of the drawings.

Figure 1:
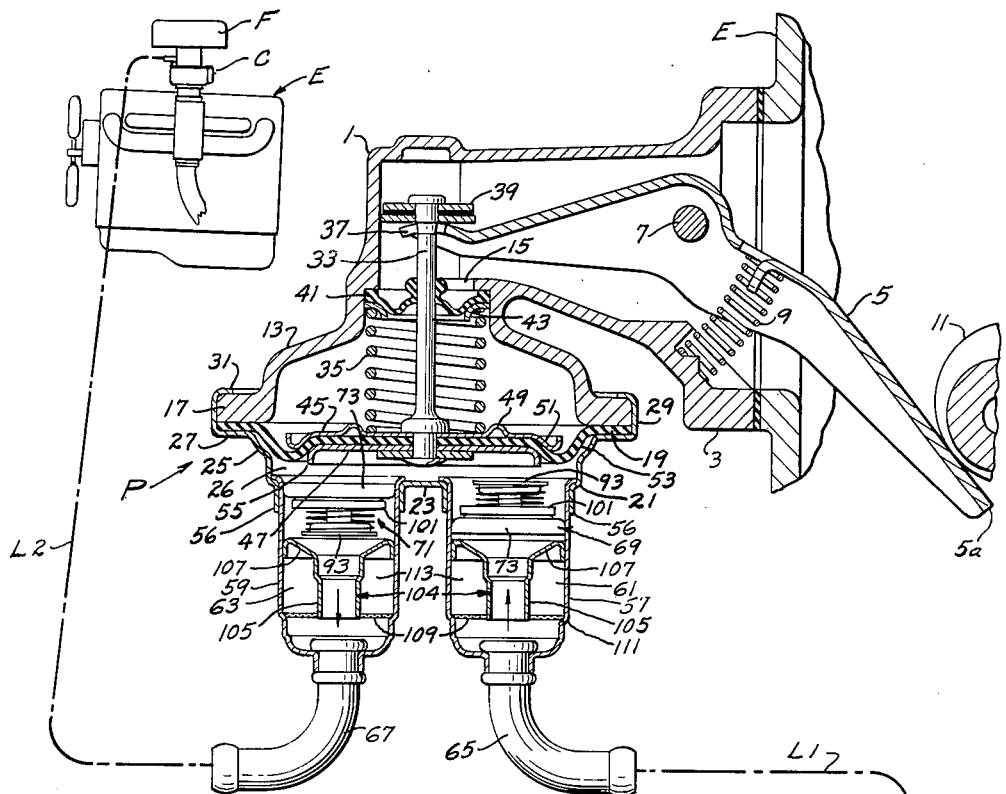

Referring to FIG. 1 of the drawings, there is indicated at E the engine of an automotive vehicle on which is mounted a fuel pump P having valves of this invention incorporated therein. Fuel is delivered from fuel tank T of the vehicle through a line L1 to the fuel pump P and delivered by the latter through a line L2 to the carburetor C for the engine. The carburetor is mounted on the intake manifold of the engine, and an air filter F is shown mounted on the air horn of the carburetor.

As appears in FIG. 1 pump P is a so-called inverted pump, i.e., its inlet and outlet are located at the bottom of the pump. Pump P comprises a rocker arm housing 1 which is open at one end (its right end as appears in FIG. 1), this end being referred to as the inner end of the housing. This housing is of generally rectangular form in vertical cross section and of decreasing height from its inner end to its outer end (which is closed). At its inner end it has a flange 3 for attaching it to the engine E. A rocker arm 5 is pivoted at 7 in the housing for rocking motion on a horizontal axis transverse to the housing. Arm 5 has a portion 5a projecting out of the open inner end of the housing, and is biased to rock counterclockwise as viewed in FIG. 1 by a spring 9. When the pump is mounted on the engine, the free end portion 5a of the rocker arm is engaged by an engine-driven eccentric or cam 11 On rotation of the cam through half a revolution from its FIG. 1 position (wherein the low point of the cam engages portion 5a of the rocker arm), the rocker arm is rocked clockwise from its FIG. 1 position against the bias of spring 9. The latter is adapted to return the arm counterclockwise during the succeeding half-revolution of the cam.

Extending downward from the rocker arm housing 1 at its outer end is a hollow conical pump head 13. An opening 15 is provided between the interior of housing 1 and the hollow head 13 at the top of the latter. The conical head has an outwardly projecting flat rim 17 at the bottom. The bottom of this rim constitutes a seating surface for the margin of an annular diaphragm 19 consisting of a relatively thin disk of flexible fuel-resistant material, such as a suitable synthetic rubber, which, when in unstressed condition, is flat or substantially flat. The outer margin of the diaphragm is clamped against the bottom of rim 17 by a pump body 21 which is of one-piece thin-walled sheet metal construction, formed of shallow cup shape, having a bottom or end wall 23 and a flaring, rounded annular peripheral wall 25 defining a pumping chamber 26, with an outwardly extending annular flat flange 27 at the top of wall 25, and a cylindric rim 29. The body 21 is maintained in assembly with head 13 by spinning the rim 29 over on rim 17 of the head as indicated at 31, with the margin of the diaphragm clamped between rim 17 and flange 27 under sufficient pressure to provide a fuel-tight seal all around the margin of the diaphragm.

The diaphragm is adapted to be pulled or flexed upward by a diaphragm-actuating rod 33 and to be flexed downward by a spring 35. Rod 33 extends upward through head 13 and through the opening 15 at the top of the head into the rocker arm housing 1. The rocker arm 5 has a slot 37 at its end in housing 1 receiving the rod 33. The latter has a collar 39 at its upper end engageable by this end of the arm 5. The rod extends slidably through an oil seal and rod guide 41 held in an annular recess at the top of the head 13 by the reaction on a seal retainer ring 43 of the spring 35, this spring being a coil compression spring surrounding the rod. The diaphragm is mounted on the lower end of the rod 33 between a pair of circular plates 45 and 47, plate 45 being the upper plate and plate 47 the lower plate. The upper plate is formed with an annular corrugation or rib 49 forming a seat for confining the lower end of spring 35. The upper plate is of larger diameter than the lower plate and the margin of the upper plate which overhangs the lower plate is flared outward and downward to provide a rim 51 constraining the diaphragm to have an annular, free, nonreversing loop 53. The lower plate has a curved rim 55 engaging the loop. In the downward position of the diaphragm illustrated in FIG. 1, the outside of the lop engages the rounded flaring wall 25 of the pump body 21. When arm 5 is rocked clockwise by cam 11, it lifts the rod and pulls the diaphragm upward. This loads the spring 35. Then when arm 5 rocks counterclockwise, spring 35 is adapted to drive the diaphragm and rod downward.

The bottom wall 23 of the sheet metal pump body 21 is formed with two circular openings and annular flanges 56 extending downward around these openings. Two deep-drawn cylindrical cup-shaped projections 57 and 59 have their upper ends received in flanges 56 and secured therein in fluid-tight manner. Projections 57 and 59 extend downward from bottom wall 23 of body 21 on opposite sides of the center of the bottom wall. Projection 57 defines an inlet passage or intake cavity 61 and projection 59 defines an outlet passage or discharge cavity 63. An inlet elbow 65 is provided at the lower end of projection 57, and an outlet elbow 67 is provided at the lower end of projection 59. It will be understood that, in the installation shown in FIG. 1, supply line L1 is connected to inlet elbow 65 and discharge line L2 is connected to outlet elbow 67. An intake check valve 69 is provided in the intake cavity 63 and a discharge check valve 71 is provided in the discharge cavity 63. Elbow 65 provides for connection of supply line L1 to intake cavity 61 upstream from the intake check valve 69 and elbow 67 provides for connection of discharge line L2 to discharge cavity 63 downstream from the discharge check valve 71.

Figure 2:
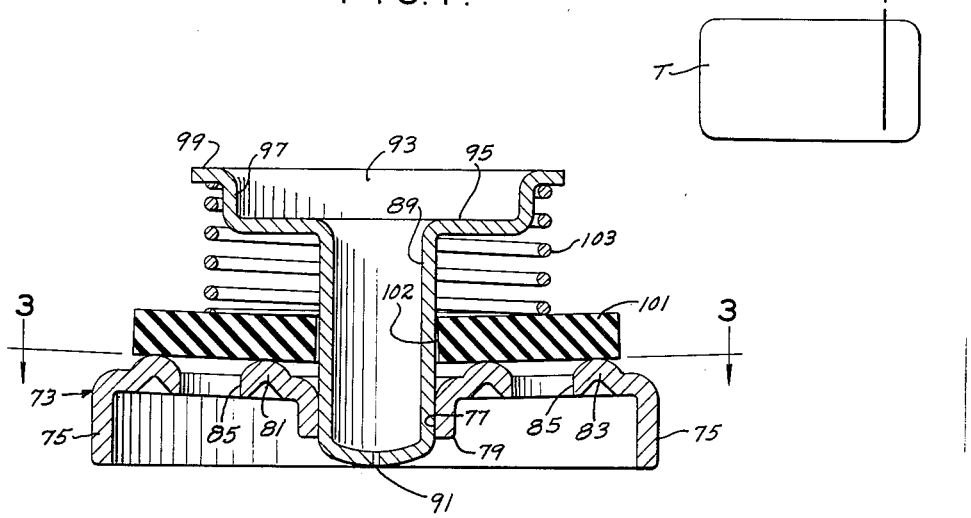
FIG. 2 is an enlarged vertical cross section of one of the check valves.
Figure 3:
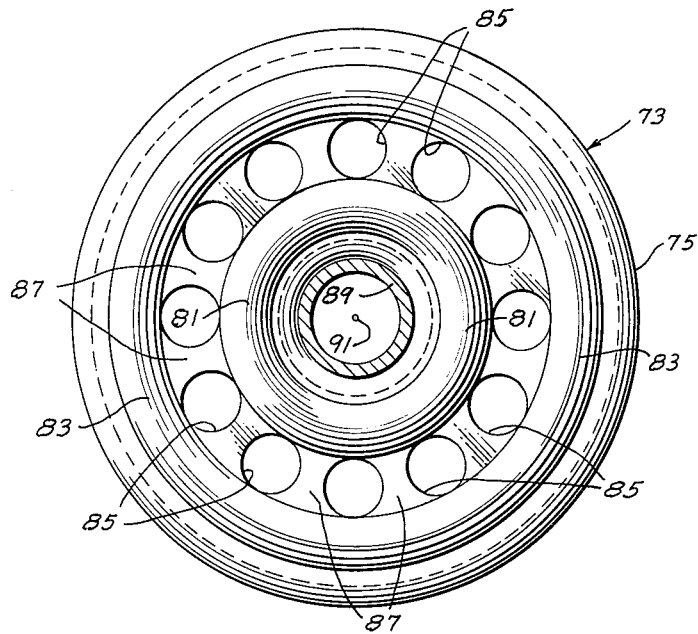
FIG. 3 is a section taken substantially on line 3—3 of FIG. 2.

FIGURES 2 and 3 disclose in detail the novel features of a check valve, in accordance with the invention. Check valves 69 and 71 are of identical construction. Each check valve comprises a circular sheet metal valve seat 73 having a cylindric rim 75 sized for a press fit in either cavity 61 or cavity 63, as the case may be. Seat 73 has a central hole 77 with an annular boss 79 around the hole extending the same direction as the rim 75. The seating face of seat 73 has concentric inner and outer circular ribs 81 and 83 projecting therefrom. These ribs are pressed from the seat and spaced apart a sufficient distance to accommodate a series of ports 85 arranged in a concentric circle between the ribs. The dimension of each of these ports as measured along the stated circle is less than the distance measured radially from the periphery of the center hole 77 to the periphery of the seat 73. Particularly, the ports are circular holes of smaller diameter than the center hole 77. They are equally and closely spaced around the stated circle at intervals such as to leave spoke-like portions 87 of the valve seat 73 between the ports with these spoke-like portions narrower than the diameter of the ports 85.

Press fitted in the boss 79 is a tubular sheet metal stem 89 having an integral closure at its lower end with a small opening 91 therein as indicated in FIG. 2. Opening 91 is a bleed or pressure-relief port to relieve excessive vapor pressure within pumping chamber 26 such as may become present, for example, when engine E is stopped after a hot run. Stem 89 has a bowl-like head 93 at its other (open) end, comprising an annular flat flange 95 integral with the open end of the stem and a cylindric rim 97 about the periphery of the flange. Rim 97 has an outwardly extending lip 99 at its upper end.

A valve member 101 constituted by a disc of elastomeric material, such as a suitable fuel-resistant synthetic rubber, having a center hole 102 slightly larger than the stem 89, is slidable on the stem toward and away from the valve seat 73. Valve member 101 in unstressed condition is flat, and has a diameter somewhat greater than the diameter of the outer rib 83. A coil compression spring 103 surrounding the stem reacts from head 93 against the valve member to bias it toward the seat. This spring is a relatively large-diameter cylindric spring, having a diameter greater than the diameter of inner rib 81 and less than the diameter of the outer rib 83. Accordingly, the valve member end of the spring engages the valve member around a circle between the confines of the ribs (and between the confines of the ports). The diameter of the spring is preferably such that the stated circle of engagement is substantially midway of the ribs, thereby to distribute the spring load substantially equally between the ribs. The outer end of the spring is seated against lip 99, surrounding rim 97, and is centered by rim 97 (which has a diameter appropriate for this purpose).

As appears in FIG. 2, seat 73 is preferably dished so as to be slightly concave on its valve seat face. Outer rib 83 is accordingly somewhat higher than inner rib 81 so that, on closure of the valve member 101, the valve member first engages the outer rib, then flexes slightly and engages the inner rib. Both ribs are preferably of a rounded or arcuate cross section as appears in FIG. 2, to minimize the possibility of accumulation of dirt on the ribs under the valve member.

Referring to FIG. 1, it will be seen that the inlet check valve 69 is fitted in cavity 61 with its valve seat 73 down and its head 93 up, and the outlet check valve 71 is fitted in cavity 63 with its valve seat 73 up and its head 93 down. Accordingly, the valve member 101 of inlet check valve 69 is adapted to open upward on an upward intake stroke of diaphragm 19, and to close downward on a downward discharge stroke of the diaphragm; and the valve member 101 of outlet check valve 71 is adapted to open downward on a downward discharge stroke of the diaphragm and to close upward on an upward intake stroke of the diaphragm.

Fitted in each of cavities 61 and 63 below the respective check valves 69, 71 is a sheet metal valve member generally designated 104 comprising a tubular stem 105 and a flaring head 107 on the upper end of the stem. The cavities are of such height as to accommodate both the valves and members 104. Each member 104 is arranged axially in its respective cavity, being pressed down in the cavity, to a point where the lower end of its stem 105 is spaced somewhat above the bottom of the cavity. A screen 109 is provided at the lower end of each stem 105. Each screen is of flat circular form with a center hole receiving the lower end of the stem and is fitted against a step 111 in each cavity 61 and 63. Each member 104 forms an annular surge chamber 113 around stem 105 and between screen 109 and flaring head 107. Each chamber 113 constitutes a dome in which fuel vapor (as distinguished from liquid fuel) may be trapped, and is in communication with the lower end of the respective cacity through the interstices in screen 109. Each screen may be a woven wire screen preferably of from 60–70 mesh, although this may be varied.

In the operation of the pump P on demand for fuel from the carbuertor, diaphragm 19 is flexed up and down by the action of cam 11 and spring 35. On an upward (suction) stroke of the diaphragm, the intake check valve 69 opens and the discharge check valve 71 closes, and fuel is drawn into the pumping chamber 26 below the diaphragm. On a downward (discharge) stroke of the diaphragm, the intake check valve 69 closes and the discharge check valve 71 opens, and fuel is forced out through line L2 to the carburetor. Valve 69 opens by upward movement of its valve member 101 away from its seat 73 against the bias of its spring 103, and closes by downward movement of the valve member 101 into engagement with ribs 81 and 83. Valve 71 (which is upside down in relation to valve 69) opens by downward movement of its valve member 101 away from its seat against the bias of its spring 103, and closed by upward movement of its valve member 101 into engagement with ribs 81 and 83.

With the valve seat end of the spring 103 engaging the valve member 101 of each valve around a circle between the confines of ribs 81 and 83, the valve member 101 is effectively held against warping in the direction away from the seat, even under conditions of relatively high heat from the engine, thereby to assure proper seating of the valve member. Thus, if there is any tendency of either the inner peripheral edge or the outer peripheral edge of member 101 to warp out of the plane of the valve member 101, spring 103 by applying its bias between the ribs 81 and 83 will force both edges of member 101 onto the respective rib. This action eliminates valve leakage due to improper seating of the member 101 on the ribs 81 or 83 due to warpage.

With the ribs 81 and 83, and particularly with these ribs of rounded cross section, dirt flushes readily off the ribs, so that the possibility of nonclosure of the valve member due to dirt thereunder is minimized. With the spring applying its force to the valve member at a distance relatively remote from the center hole 102 in the valve member, the tendency is against opening and closing of the valve member by bending around the circle of engagement of the spring with the valve member, and toward opening and closing of the valve member primarily by sliding of the valve member 101 on stem 89, which makes for more of a snap-action and faster full seating and unseating of the valve member, as is desirable for improved pumping action.

The valve seat 73 has been described as being formed with rib 83 extending above rib 81 from the surface of the seat 73. This is not critical but offers a somewhat better valve closing action. However, with the bias of spring 103 applied between the ribs 81 and 83, the valve will also operate with the ribs 81 and 83 at the same height or with rib 81 higher than 83. The invention is not limited to a difference in height of ribs 81 and 83.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

A valve particularly for use as a check valve in an automotive fuel pump comprising a circular valve seat having a central aperture therethrough and a cylindrical rim extending generally at a right angle from one face of the seat, said seat having a pair of circular ribs and a plurality of ports through said valve seat between said ribs, said ribs being concentric with said central aperture and of an arcuate cross-section to form rounded surfaces projecting from said one face of the seat to minimize the accumulation of foreign matter on said ribs, a stem of tubular sheet metal having one end fitted in said central aperture in said seat and having an integral closure at said one end, a pressure relief port formed in said closure, a head on the stem, said head being constituted by an integral annular flange at the other end of said stem, said flange having a cylindric rim extending in the direction away from said seat, an annular lip projecting laterally from the material edge of said cylindric rim, a valve member constituted by a valve disc of elastomeric material slidably mounted on said stem and seating on the rounded surface of said ribs, and a coil compression spring surrounding said stem and positioned with one end portion engaging about said cylindric rim and the terminal of said portion seating on said laterally projecting annular lip, the other end of said spring seating against the valve member to bias the valve member against the seat, said spring being of a diameter at said other end thereof to engage the valve member around a circle between the confines of said ribs.

References Cited by the Examiner
UNITED STATES PATENTS

| | | | |
|---|---|---|---|
| 1,427,837 | 9/22 | Murray | 137—516.23 |
| 1,745,304 | 1/30 | Lemex | 137—513.7 |
| 1,777,647 | 10/30 | Marchal | 137—516.15 |
| 1,976,464 | 10/34 | Shallenberg | 137—543.15 XR |
| 2,133,575 | 10/38 | Rosenberg | 137—516.11 XR |
| 2,625,114 | 1/53 | Coffey | 137—393 XR |
| 2,632,621 | 3/53 | Gamble | 137—516.23 |
| 2,753,888 | 7/56 | Glassford | 137—513.7 |
| 2,803,265 | 8/57 | Coffey | 137—516.21 |
| 2,804,086 | 8/57 | Johnston | 137—516.23 XR |
| 2,810,397 | 10/57 | Olson | 137—543.15 XR |
| 2,905,188 | 9/59 | Loew | 137—543.15 XR |
| 3,061,101 | 10/62 | Humbert | 210—310 |

M. CARY NELSON, *Primary Examiner.*